April 8, 1958 W. E. ESTELLE 2,830,261
COMBINATION VALVE AND CONDUCTIVITY CELL ASSEMBLY
Filed Jan. 5, 1954 3 Sheets-Sheet 3
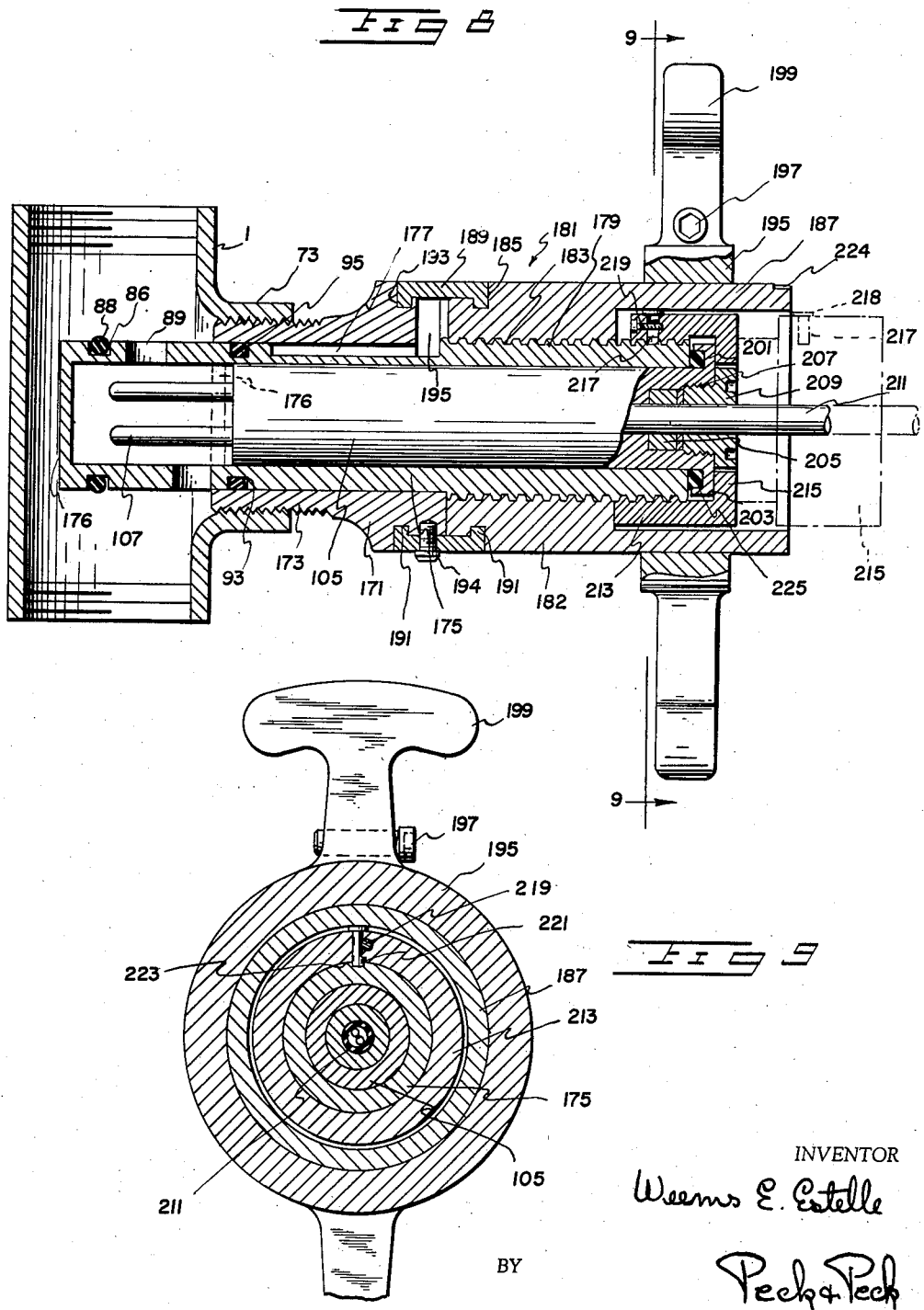
INVENTOR
Weems E. Estelle
BY
Peck & Peck
ATTORNEYS

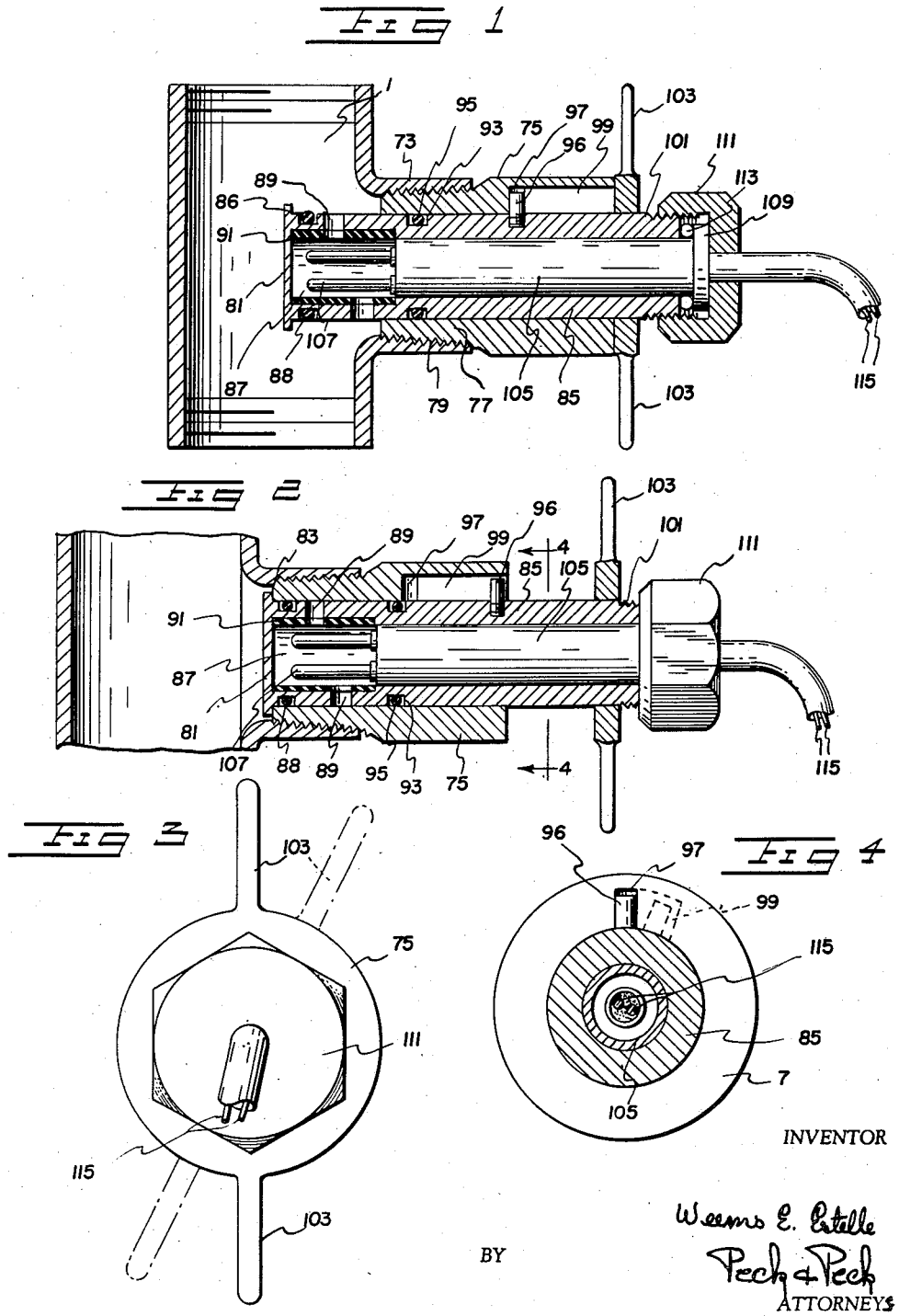

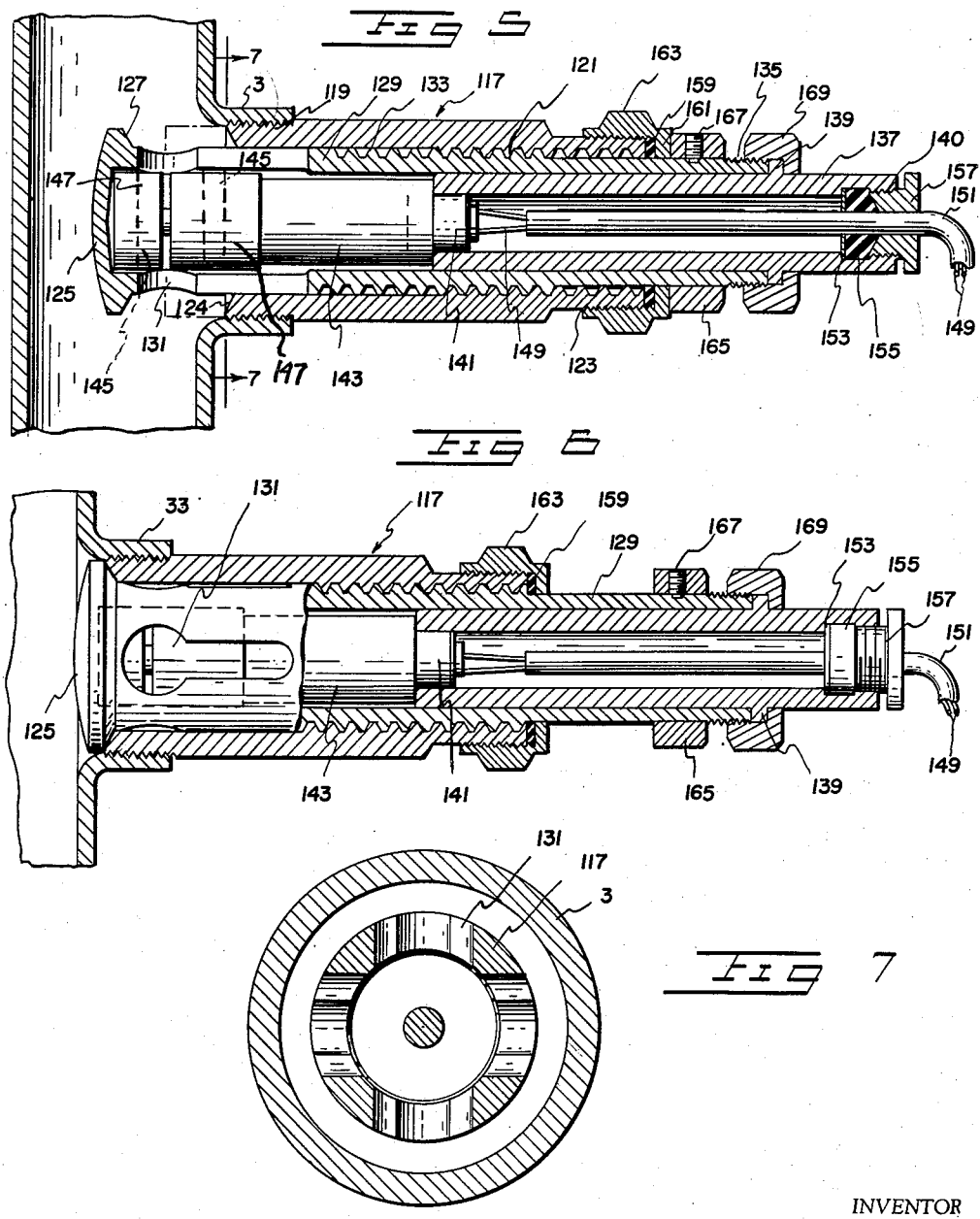

United States Patent Office 2,830,261
Patented Apr. 8, 1958

2,830,261

COMBINATION VALVE AND CONDUCTIVITY CELL ASSEMBLY

Weems E. Estelle, Annapolis, Md., assignor to McNab, Incorporated, New York, N. Y., a corporation of New York Application January 5, 1954, Serial No. 402,389

5 Claims. (Cl. 324—30)

This invention relates broadly to the art of valves for use in electrical systems for measuring and indicating the concentration of electrical conductive impurities in liquids and in its more specific aspects it relates to an assembly for mounting a conductivity cell in operative position with the electrodes thereof projected into a liquid flow conduit through an opening therein for immersion of the electrodes within the liquid, and provides mounting means including a valve whereby the conductivity cell may be retracted from operative position within the liquid flow conduit for replacement and/or repair while at the same time the valve is actuated to close the opening in the liquid flow conduit in order to prevent escape of liquid therefrom; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

The conductivity cells with which my invention particularly pertains are adapted to test the concentration of electrical conductive impurities within a liquid flowing within a conduit, or in a liquid contained in a tank or the like. Among other uses, cells of this character are advantageously used in measuring and indicating the salt concentration in water flowing through conduits to boilers, engines, condensers and the like on ships. It is conventional practice to provide an opening in the wall of the liquid flow conduit, or of a tank, in which the housing for the conductivity cell is fixed in such manner that the electrodes of the cell are disposed within the liquid under test. In actual practice it has been found that the electrodes must be replaced or cleaned or repairs made thereto or to the cell at relatively frequent intervals as they become corroded and otherwise incapable of properly performing their measuring function. When it is necessary to replace or otherwise repair the electrodes or any other elements or parts of the conductivity cell, it will be obvious that it is essential to withdraw the conductivity cell from the opening through which it projects into the interior of the liquid flow line or the liquid tank. Since most of the liquids being tested are under considerable pressure, and in any event, it will be evident that some means must be provided for either closing the opening in the liquid flow conduit or tank immediately following retraction and removal of the conductivity cell or of providing some means either directly in the opening or adjacent thereto for preventing escape of the liquid from the conduit or tank.

In this embodiment of my invention I have illustrated and described an adaptation of my invention to liquid flow conduits, but it is to be understood that it is fully within my contemplation to use this valve assembly in tanks or the like where the liquid to be tested is stored.

It has been more or less conventional practice to movably mount the conductivity cell and its assembly within an elongated housing which is fixedly mounted on the liquid flow conduit at the opening thereof and to provide this housing with a gate valve or the like. In such arrangements the conductivity cell is removably mounted in the housing in sealed relation with respect thereto so there will be no escape of liquid when the cell is operatively fixed in the housing. This has necessitated the utilization of a variety of sealing rings, retaining elements and the like.

It has been one of my primary purposes in designing a valve and conductivity cell assembly to eliminate the gate valve of prior art assemblies and to provide an integrated much more simplified and efficient assembly wherein the valve structure for the opening in the conduit is of such form that it actually mounts and carries the conductivity cell assembly.

Due to this unique combination of valve and conductivity cell wherein the prior art gate valve is eliminated from the combination, damage to the cell caused by closing the gate valve before sufficient withdrawal of the conductivity cell from the housing is prevented.

In apparatus of this character of which I am aware, the removal of a conductivity cell for replacement or repair of parts thereof constitutes a considerable task for it is necessary to release the various sealing means mentioned above so that the conductivity cell and its assembly may be withdrawn from the housing, and in this operation it is necessary to actuate the gate valve in the housing as soon as the cell has been withdrawn past the point in the housing where the gate valve is positioned in order to prevent the escape of liquid rearwardly from the housing. It will be appreciated that this type of mounting and the assembly arrangement for a conductivity cell is inherently complex and disadvantageous in the consumption of considerable time and effort in the operation of removing the cell from its mounted operative position. It is also a fact that the present known arrangements for mounting a conductivity cell in operative position as described is expensive not only in time required to assemble and disassemble but also in the number of parts and elements required for the assembly.

It has been one of my major purposes in evolving this invention to overcome the complexities and disadvantages which are inherent in such mounting arrangements of which I now know. The invention I am about to describe provides a simple mounting assembly for a conductivity cell which may be assembled and disassembled with facility and which insures against the escape of the liquid which is flowing in the conduit and which is under test.

In overcoming the disadvantages of structure and operation of mounting assemblies and arrangements for conductivity cells in liquid flow conduits I have eliminated many of the parts and elements previously used and have provided assembly arrangements which include a valve, which reduces the number of manual steps and operations to remove the cell from operative position in the assembly or to associate it with the assembly into operative position. In prior assemblies of which I know a considerable number of manipulative operations are necessary to remove or replace the cell.

I have devised a unique valve particularly adapted for the purposes of this invention. This valve includes a head and a tubular body portion or stem which removably mounts therein the conductivity cell. The valve is reciprocably carried within a housing which is mounted in the opening in the liquid flow conduit and is coactive with the housing to close the opening in the conduit for removal of the conductivity cell. The valve and its tubular stem may be mounted for straight push pull reciprocable action to open and closed position or it may be mounted for rotation to produce reciprocal action to move to open and closed positions. Since the conductivity cell is removably mounted in the valve body for reciprocation therewith it will be appreciated that in the open position of the valve the electrodes of the cell will be disposed in operative position immersed in the liquid under test while in closed position of the valve the electrodes and cell will be retracted from operative position for complete removal of the cell from the valve housing.

It is highly desirable in valve and conductivity cell assemblies of this character where the cell is carried within the valve for movement therewith to provide means ensuring against removal of the conductivity cell from the valve when the valve is in open position. It will be evident that such removal when the valve is open would result in substantial leakage of the liquid under test, and injury to personnel if hot liquid was being tested. I have provided means which accomplishes this purpose. The means which I have devised is simple, efficient and requires substantially no working parts and disposes the conductivity cell and all of its components in inaccessible position when the valve is open so that the operator cannot withdraw it from its position within the valve. When the valve is closed the conductivity cell, without any extra manipulation or manual operation by the operator is disposed in position for removal from the valve.

In order to increase the effectiveness of this valve and cell assembly I have devised a simple sealing or gland arrangement which I have combined with the valve housing and the reciprocable tubular valve stem so that when the valve is in open position with the electrodes in position projecting into and immersed in the liquid under test there will be no leakage of the liquid between the fixed valve housing and the reciprocable tubular valve stem. I have accomplished this highly desirable and necessary sealing arrangement with a minimum number of parts and elements which require practically no attention whatsoever.

I have also provided a sealing arrangement between the relatively movable tubular valve stem and the body of the conductivity cell which is movably mounted in the valve stem to prevent the escape of liquid between these two relatively movable members so that the entire apparatus is completely sealed against liquid escape regardless of whether the valve is in open or closed position.

It has also been one of my purposes in designing this combination valve and conductivity cell assembly to provide operating means for opening and closing the valve and for removing the conductivity cell from its mounted position within the valve stem which is easily actuable and is readily accessible to the operator of the apparatus. It will be appreciated that the simplicity of the apparatus and its solution of many of the problems and disadvantageous characteristics of prior operative mounting arrangements of conductivity cells will result in substantial operating efficiencies and economies. I have devised a combination valve and conductivity cell assembly having relatively few operating parts which may be assembled quickly and easily and which will function under normal conditions of use for relatively long periods of time without requiring attention or the replacement of parts.

It has been one of my purposes to devise a valve and conductivity cell assembly which will accommodate and operate with relatively small or reduced size conductivity cell assemblies for mounting in reduced diameter conduits or for portable and other uses requiring a small size cell.

The assembly of this invention also provides means on the valve preventing conduction from the electrodes to thereby ensure a uniform field pattern between the electrodes.

With the foregoing general objects, features and results in view, as well as certain others which will be apparent from the following explanation, the invention consists in certain novel features in design, construction, mounting and combination of elements, as will be more fully and particularly referred to and specified hereinafter.

In the accompanying drawings:

Fig. 1 is a view in longitudinal section of the unit in mounted position with the valve open and the conductivity cell being shown in side elevation.

Fig. 2 is a view similar to Fig. 1 with the valve shown in closed position.

Fig. 3 is an end view of the device shown in Fig. 1.

Fig. 4 is a view taken on line 4—4 of Fig. 2.

Fig. 5 is a view in longitudinal section through a further form of unit, the valve being shown in open position, and the conductivity cell being shown in side elevation.

Fig. 6 is a view similar to Fig. 5 with the valve shown in closed position.

Fig. 7 is a view taken on line 7—7 of Fig. 5.

Fig. 8 is a view in longitudinal section of a modified form of unit in mounted position with the valve open, a portion of the conductivity cell being shown in side elevation.

Fig. 9 is a view taken on line 9—9 of Fig. 8.

Referring to the accompanying drawings, and particularly Figs. 1 through 4 thereof, I have illustrated one form which my invention may take from among many, and the assembly disclosed involves the concept of removably mounting a conductivity cell or generally similar testing means within a valve for movement therewith to and from open and closed positions.

In this form of my invention the numeral 73 indicates a threaded end of a union 1 or the like which is fixed in any suitable manner in a liquid flow conduit, tank or the like in which the liquid to be tested is flowing or stored. A valve housing 75 having an externally threaded nipple portion 77 is threaded as at 79 into the end 73 of the union. The valve comprises a disc-like generally flat valve head 81 of greater diameter than the internal diameter of nipple portion 77 and valve housing 75 so that in closed position of the valve the head seats on the forward edge of the nipple as at 83 as shown particularly in Fig. 2 of the drawings. The valve head 81 is formed on the front or forward end of a tubular valve stem 85 which is provided with a circumferential groove 86 adjacent to but rearwardly spaced from the head 81. A sealing ring 88 of rubber or the like is seated in the groove 86. The tubular valve stem is formed at its forward end with an enlarged internal diameter portion 87 having openings or apertures 89 extending through the wall thereof and the internal surfaces of this enlarged forward portion are preferably lined or coated with an insulating plastic or other insulating material 91. Adjacent to but rearwardly spaced from the enlarged cavity forming portion 87 of the tubular valve stem 75 I form an external circumferential extending groove 93 which receives a rubber or the like material sealing ring 95. Rearwardly of the groove 93 I fixed a pin 96 in the valve stem which extends outwardly of the tubular valve stem and this pin projects into a reduced length circumferential slot 97 having a longitudinally extending slot 99 in communication with one end thereof which form together a bayonet slot. External threads 101 are formed on the tubular valve stem inwardly a distance from the rear end thereof. I provide a pair of preferably diametrically opposed operating handles 103 which are fixed to and extend radially from the valve stem forwardly of the threaded portion 101.

The conductivity cell 105 which is of cylindrical shape is removably mounted within the tubular valve stem 85 in position therein so that the pencil or other type electrodes 107 extend into the diametrically enlarged portion 87 of the valve stem. The conductivity cell is preferably formed with an annular radial flange 109 on the rear end thereof which in operative cell mounted position abuts against and compresses a sealing ring 113 against the rear end of the tubular valve stem. The conductivity cell is releasably maintained in operative mounted position within the valve stem by means of a cap nut 111 which in operative position is screwed on the threads 101 on the end of the valve stem into tight engagement with flange 109. Electric cables 115 extend from the cell through a central opening in the nut for connection with any suitable electric indicating circuit.

In Fig. 1 of the drawings the valve housing is disclosed in operative position threadedly mounted in the fitting or union 73 of the liquid flow conduit or tank. The valve is shown in open position with the head removed from and unseated with respect to the forward end of the nipple and the conductivity cell is removably fixed in the tubular valve stem by means of the cap 111 and the electrodes are in operative position within cavity 87 so that the liquid under test will flow through the apertures 89 and be in full contact with the electrodes. In this position of the various parts of the assembly the sealing ring 95 will prevent any seepage between housing 75 and valve stem 85. In this operative position of the assembly with the valve stem in forward projected position it will be releasably locked in such position since pin 95 will be in the end of transverse slot 97 remote from longitudinal slot 99.

When it is necessary to remove the conductivity cell from its mounted operative position within the tubular valve stem for any reason whatsoever the operating handles 103 are grasped and rotated sufficiently to rotate the valve stem and the pin 95 sufficiently to move the latter to the opposite end of circumferential groove 97 whereupon the handles are pulled rearwardly thereby axially rearwardly moving the valve stem in the housing until pin 95 engages the rear end of slot 99 in which position the valve head 81 will seat on the forward end of the nipple and due to the sealing action of ring 88 the outlet from the liquid flow conduit will be closed. This closed position of the valve is illustrated in Fig. 2 of the drawings. With the operative parts of the assembly positioned as disclosed in Fig. 2 the conductivity cell may be removed simply by unscrewing cap nut 111 and then pulling the cell from its position within the tubular valve stem.

To assemble it is merely necessary to insert the conductivity cell in the valve stem, lock it therein by screwing cap 111 on the stem. Then the handles 103 may be pushed forwardly thereby moving the valve forwardly unseating valve head until pin 95 abuts against the forward end of slot 99 whereupon the handles are rotated until the pin reaches the opposite end of slot 97. Thus the assembly is in operative position as illustrated in Fig. 1 with the electrodes immersed in the liquid being tested. The insulating plastic or other coating 91 prevents conduction from the electrodes and insures a uniform field pattern between them. If found desirable the walls of apertures 89 may similarly be coated.

It will be appreciated that by a simple push and pull action and a slight rotary motion of the valve of this form of my invention may be opened and close for assembly and disassembly of the parts thereof.

I have illustrated a further form which my invention may take in Figs. 5 through 7 of the drawings. In this form of my invention I provide a valve housing designated generally by the numeral 117 having an externally threaded forward end or nipple forming portion as at 119 which is adapted to be threadedly fixed to a fitting 3 attached to a liquid flow conduit, tank or the like 1.

The valve housing 117 is provided with an internal threaded portion 121 which extends from the rear end of the housing forwardly to approximately the midpoint of the housing. A distance inwardly from the rear end of the housing 117 I provide an externally threaded portion 123, and at the forward edge or end of the housing a bevelled valve seat 124 is provided.

In this form of my invention as in that form particularly illustrated in Figs. 1 through 4 of the drawings I provide a valve assembly including a disc-like valve head 125 having the bevelled rear edge surface 127 which is coactive with the valve seat 124 when the valve is in closed position to thereby seal off the opening in the liquid flow conduit, tank or the like. The valve head 125 is fixed to a tubular valve stem 129 which is provided adjacent the valve head with a plurality of liquid flow apertures or openings therein designated by the numeral 131, and as particularly illustrated in Fig. 6 of the drawings, these apertures may take the form of keyhole slots. The tubular valve stem is provided with a threaded section 133 which extends rearwardly a distance from the tail of the keyhole apertures and these threads, when the valve stem is in operative position, are adapted to mesh with the threads 121 which are provided internally of the housing 117. Adjacent the rear end of the tubular valve stem we provide an additional threaded portion indicated by the numeral 135 for a purpose to be hereinafter explained.

The assembly which I utilize for mounting the conductivity cell in the tubular valve stem for movement therewith includes an inner sleeve 137 which is adapted to be inserted within the tubular valve stem 129 and to have a sliding fit therewith, the distance which the sleeve may be projected into the valve stem being determined by an annular rib 139 which extends radially outwardly from the inner sleeve 137 and is adapted to engage the rear end of the valve stem when the inner sleeve is in operative position mounted within the stem. At its rear end the inner sleeve 137 is provided with an internal threaded section 140. The conductivity cell assembly is mounted in and fixed to the inner sleeve 137 by means of a projecting portion 141 which projects rearwardly a distance into the inner sleeve from the body 143 of the conductivity cell. Electrodes 145 project forwardly from the cell body and in the particular type of electrode arrangement illustrated the electrodes are provided with peripheral insulating members 147. It is to be fully understood that the embodiment of my invention which is especially disclosed in Figs. 5 through 7 may be used equally well with pencil or any other suitable type electrodes and therefore it is not my intention to limit this form of valve and conductivity cell assembly to cells having the particular type of electrode disclosed. It will also be fully appreciated that when the conductivity cell assembly is operatively mounted within the tubular valve stem the electrodes 147 will extend into the area defined by that portion of the circumferential wall of the valve stem which includes the liquid flow apertures 131 therein.

Electric leads 149 project from the rear end of the conductivity cell and these leads may be encased within a cable 151 which extends through the sleeve 137. I may close the rear end of the sleeve by means of a centrally apertured washer 153 and a centrally apertured rubber or the like packing element 155 which elements are mounted in position by means of a gland nut 157 which is threaded onto the threads 139 which are provided at the rear of the inner sleeve.

When it is desired to assemble this apparatus into the operative position illustrated in Fig. 5 of the drawings, the valve housing 117 is threaded into the fitting or union 3, the tubular valve stem having preferably previously been threaded into the valve housing in position therein so that the valve head 125 and its bevel 127 is seated on the valve seat 124 so that the valve is in closed position. The inner sleeve 137 carrying the conductivity cell assembly may then be inserted into the tubular valve stem and pressed forwardly therein until the rib 139 abuts against the rear end of the valve housing. I may then incorporate with the entire assembly the leak-preventing sealing means for sealing against liquid seepage between the valve housing and the valve stem. This sealing means may consist of an O ring 159 which is maintained in compressed position against the rear end of the valve housing by means of the annular inwardly depending flange 161 of a cap or retaining nut 163 which is screwed onto the threads 123 which are provided externally of the valve housing adjacent the rear end thereof. I then provide actuating means for causing rotation of the tubular valve stem to either open or close the valve and this actuating means comprises a nut 165 which is fixed on the valve stem by means of a set screw 167. In order to releasably maintain the inner sleeve 137 and its conductivity cell assembly in proper position operatively mounted within the tubular valve stem for movement therewith I provide a nut or the like 169 which is threaded on the threads 135 which are provided externally of the valve stem adjacent the rear end thereof and this lock nut 169 is provided with an inner annular groove for receiving the rib 139 therein to thereby releasably maintain the inner sleeve 137 in its position within the valve stem. With all the parts assembled as described, the cable 151 carrying the electric leads 149 will extend through the central apertures which are provided when the washer 153, the packing ring 155 and the gland nut 157 are in operative positions.

When it is desired to operate the assembly to open the valve so that the electrodes 145 and 147 will be in operative salinity testing position immersed in the liquid under test the operator of the device merely rotates the valve stem by grasping the nut 165 which due to the fact that the valve stem is threadedly associated with the fixed valve housing will cause axial movement of the valve stem and its contained inner sleeve and conductivity cell assembly.

In Figs. 8 and 9 of the drawings I have illustrated a further form of conductivity cell assembly which includes among other structural modifications, the novel and unique means which I have devised for preventing removal of the conductivity cell from its operative mounted position within the valve when the valve is open. It has been one of my purposes in designing this arrangement preventing removal of the conductivity cell when the valve is open to maintain simplicity of structure and operation and economy of production of the entire assembly. The structure by which I obtain these highly advantageous features is so arranged in the assembly that in open position of the valve the elements which are manually operable to cause release of the conductivity cell are in a position which is inaccessible to the operator of the valve.

In describing this form of my invention I have used the same reference characters as those heretofore used to designate similar parts of the assembly. This assembly is adapted to be removably mounted within a union 1 or the like which is inserted in any suitable and conventional manner in a liquid flow conduit and this union 1 includes a radially extending internally threaded neck 73. The assembly includes a housing 171 having on its forward end a threaded nipple portion 173 which is threadedly mounted in the neck 73 of the union 1 as particularly illustrated in Fig. 8 of the drawings.

In this form of my invention I provide an elongated valve 175 in the form of a sleeve which is closed at its forward end by an imperforate head or cap 176. As will be explained hereinafter, this valve sleeve is operatively mounted within the housing 171 in generally the same manner that the tubular valve stems are mounted in the housings in those forms of my invention illustrated in Figs. 1 through 7 of the drawings. Adjacent to but rearwardly spaced from the head or closure cap 176 I form a circumferential groove 86 which seats and receives therein a sealing ring 88, and the valve sleeve rearwardly of the circumferential groove 86 is provided with a plurality of apertures 89 through which the liquid under test is adapted to flow when the valve sleeve is in open operative position. The valve sleeve 175 is provided with a further circumferential groove 93 which is adapted to receive therein a sealing ring 95, the groove 93 being rearwardly spaced relative to apertures 89.

The valve sleeve 175 is provided with an external longitudinally extending slot 177, the purpose of which will be explained in detail hereinafter. The valve sleeve 175 is formed with an external threaded portion 179 which extends forwardly a distance from the rear end thereof. As in the other forms of the invention described herein, the valve sleeve is adapted to be reciprocated within the housing 171 to dispose the valve in open position with the forward closed end thereof extended into the union 1 and the forward sealing ring 88 projected beyond the confines of the housing so that the liquid may flow into the forward portion of the valve sleeve through the flow apertures 89 which are provided therein. This open position of the valve is illustrated in Fig. 8 of the drawings. In closed position of the valve sleeve the sleeve is retracted so that the head or cap 176 is substantially flush with the forward end of the housing 173 as illustrated in dotted lines in Fig. 8 of the drawings. It will be appreciated that in this closed position, the sealing ring 88 and the cap or head 176 prevent entry of the liquid under test into the valve sleeve.

In order to produce this reciprocal action in the valve sleeve and in order to provide means preventing removal of a contained conductivity cell when the valve is open, I provide a sleeve-nut member designated in its entirety by the numeral 181. This sleeve-nut member comprises a forward nut-forming portion 182 which is internally threaded as at 183, and at its forward portion is of reduced external diameter, a circumferential groove 185 being provided at the rear end of said reduced diameter portion. Rearwardly of the nut-forming portion the internal diameter of the sleeve nut is increased to provide a concealing sleeve portion 187. In operatively mounting the sleeve nut 181 in the assembly, the threads thereof are meshed with the threads 179 of the valve sleeve, with the sleeve-providing portion 187 positioned rearwardly, and the sleeve nut is restrained from reciprocal or axial movement when it is rotated relative to the tubular valve sleeve by means of a clamping ring 189 which is provided with inwardly extending flanges 191 on each edge thereof, one of the flanges extending into the groove 185 of the sleeve-nut 181 while the other flange extends into a circumferential groove 193 which is provided in the housing adjacent the rear end thereof. The clamping ring or band 189 is attached in position by a screw 194. Prior to assembling the band 189 in operative position on the assembly a pin 195 is soldered or otherwise fastened to the rear edge surface of the housing 171 in position thereon so that it extends into the axial slot 177 of the valve sleeve. Operating means for rotating the sleeve-nut member 181 is provided and such means may consist of a split ring 195 which is clamped by means of a screw or the like 197 about the rear sleeve like portion 187 of the sleeve-nut member 181, and to facilitate the operation or rotation of the sleeve-nut member I may provide diametrically opposed handle members 199 which extend radially from the clamping band 195.

It will be appreciated, that with the elements of my invention which have thus far been described in assembled operative position with the sleeve-nut member threaded on the external threaded portion of the valve sleeve or tubular member, the sleeve-nut member may be rotated manually by the operating handles 199 and that this member will be restrained from reciprocal or axial movement due to the action of the clamping ring or band 189 which rotatively fixes the sleeve-nut member to the housing 171 which in turn is fixed to the union 1. Rotation of the valve sleeve or tubular member will be prevented by the pin 195 which projects into the slot 177. Thus upon rotation of the sleeve-nut member in one direction, reciprocal movement will be produced in the valve sleeve in one direction while rotation of the sleeve-nut member in the opposite direction will result in reciprocation of the valve sleeve in the opposite direction, and the valve will be opened or closed. It will be understood that retraction or closing reciprocation of the valve sleeve will be stopped when pin 195 abuts against the forward end of slot 177.

The valve assembly described is adapted to operatively mount a conductivity cell comprising a cylindrical body portion 105 from which project electrodes 107. The conductivity cell is mounted within the valve sleeve or tubular member in such position therein that the electrodes 107 project into the forward area of the valve sleeve which includes the apertures 89 so that in open position of the valve as illustrated in Fig. 8 of the drawings, the electrodes will be in full and complete contact with the liquid under test which flows into the valve sleeve through the apertures. If desired the forward portion of the inner wall of the valve sleeve may be coated with an insulating plastic or the like as disclosed at 91 in Fig. 1 of the drawings. At its rear end the conductivity cell may be formed with a radially outwardly extending flange 201 which flange may be formed with a further forwardly extending flange 203 on the outer end thereof. The rear end of the conductivity cell is preferably recessed to receive therein a suitable packing element or ring 205. Threads 207 are provided in the walls of the recess in the conductivity cell and are adapted to threadedly receive a gland nut 209, the electric wire carrying cable 211 extends through the packing element 205 and the gland nut 209 to extend from the assembly.

In order to releasably maintain the conductivity cell in operative position within the valve sleeve I provide a lock nut 213 having on its rear end a radially inwardly extending flange 215. A locking pin 217 having a head 218 extends radially through the lock nut 213 for limited radial movement with respect thereto, the pin 217 being maintained against complete removal from its position within the lock nut by means of a screw or the like element 219 against which a shoulder 221 of the pin abuts when the pin is in projected position. The threaded portion 179 of the valve sleeve is axially slotted from the rear end thereof forwardly a distance as at 223 and the locking pin is adapted to project or fall inwardly into this slot when the lock nut is in full threaded position on the end of the valve sleeve as will be explained in detail hereinafter. An indicating slot 224 may be formed in the sleeve portion 187 of the sleeve-nut 181 to indicate the position of the slot in the threads.

When the valve is closed and the head 176 thereof is in substantially flush position relative to the housing, and the ring 88 is compressed between the housing and the valve sleeve to form a seal to prevent entry of liquid into the valve sleeve, the conductivity cell may be releasably locked in the valve sleeve by merely threading the lock nut 213 on the valve sleeve so that the flange 215 will abut against the flange 201 of the conductivity cell to urge the cell forwardly and to compress a packing ring 225 between the rear edge of the valve sleeve and the flange of the conductivity cell. With the conductivity cell operatively mounted as described, the valve may be opened by rotating the sleeve nut 181 in the proper direction to forwardly project the valve sleeve and its contained conductivity cell into the open position of the valve as illustrated in Fig. 8. Since the sleeve-nut member is prevented from axial or reciprocal movement by means of clamping ring or band 189, the lock nut 213 will, in open position of the valve, be disposed in inaccessible position within the sleeve portion 187 of the sleeve nut 181 so that it will not be possible for the lock nut 213 to be manually rotated to release the conductivity cell from its operative position within the valve sleeve.

When the valve is in closed position so that the lock nut 213 is projected rearwardly outside the confines of the sleeve 187 it is accessible for manual operation for unthreading from the valve sleeve to release the conductivity cell. The slot 223 in the threads on the valve sleeve is so positioned that when the lock nut 213 is fully threaded on the valve sleeve to maintain the conductivity cell in operative position, the locking pin 217 will be over the slot and will drop thereinto so that the head 218 of the locking pin will be positioned slightly below the internal circumferential surface of the sleeve portion of the sleeve nut so that in opening the valve the head 218 will slide under or within said sleeve. It will be recognized that with the locking pin in the slot and the valve open so that the nut 213 is within the confines of the sleeve portion it will be locked against rotation relative to the valve sleeve due to the fact that the pin 217 cannot be raised out of the slot.

It will be recognized that in the form of my invention illustrated in Figs. 8 and 9 I have provided simple, efficient and certain means for preventing removal of the conductivity cell from the valve sleeve or tubular member when the valve is open, thereby completely eliminating the possibility of liquid escape through the tubular valve stem.

It will be appreciated that in this form of my invention all of the working threads are completely enclosed which is a definite advantage, and that the conductivity cell may be easily inserted or removed, even when under pressure or vacuum, due to the mechanical advantage of threads. Since the sleeve or tubular member is not rotated in the projection and retraction thereof the electric wires in cable 211 will not be twisted and the entire operation will thereby be made simpler.

As pointed out above the combination valve and conductivity cell assembly of this invention may be used for testing liquids in tanks as well as in liquid flow lines, thus it is to be distinctly understood that the term "liquid flow conduit" as used in the specification and claims is intended to include liquid tanks as well as liquid flow conduits.

In all of the forms of my invention I have devised a unique assembly involving the basic concept of mounting the testing unit within a reciprocating valve for movement therewith to and from operative position. It is this concept and the structure and operating means I have devised for carrying it out that overcomes the disadvantages in prior art conductivity cells and their mounting arrangements, that constitutes an advance in this art.

I claim:

1. A valve and conductivity cell assembly including in combination, a housing adapted to be mounted on and in communication with a liquid flow conduit containing a liquid to be tested, a valve sleeve reciprocably mounted in said housing and packing means co-active between said sleeve and housing to prevent leakage of liquid therebetween, means for reciprocating said valve sleeve to and from closed position, and a conductivity cell removably mounted in said valve sleeve for reciprocation therewith and in testing contact with the liquid when the valve sleeve is in open position, and sealing means compressed between the end of the valve sleeve and the conductivity cell for preventing leakage of liquid therebetween.

2. A valve and a conductivity cell assembly including in combination a housing having a valve seat on the forward end thereof and adapted to be mounted on and in communication with a liquid flow conduit containing a liquid to be tested, a tubular valve stem mounted in said housing for axial movement therein and provided with a valve on the forward end thereof adapted to seat on the valve seat on the forward end of the housing in closed position to prevent entry of the liquid under test into the tubular valve stem, the tubular valve stem having openings in the circumferential wall thereof adjacent said valve, and means for causing axial movement of said tubular valve stem within said housing including an external threaded section on said tubular valve stem and an internal threaded section in said housing, the two sections being in mesh whereby upon rotation of said tubular valve stem it will be moved axially within the housing, and a conductivity cell removably mounted in the tubular valve stem for axial movement therewith and having a part thereof positioned in that area of the tubular valve stem defined by the circumferential wall having the openings therein for contact of said part with the liquid entering through the openings.

3. A valve and conductivity cell assembly including in combination, a housing adapted to be mounted on and in communication with a liquid flow conduit containing a liquid to be tested, a tubular member reciprocally mounted in said housing for movement to retracted closed position and projected open position and said tubular member having its forward end closed and provided with openings in the circumferential wall thereof adjacent said forward closed end, and said tubular member including means co-active with said housing to prevent entry of liquid into the tubular member when in retracted closed position, and further means co-active between said tubular member and said housing for preventing flow of the liquid being tested rearwardly between said tubular member and the housing in all positions of said tubular member in its movements between open and closed positions, and locking means on said tubular member for releasably locking said tubular member in open position, and a conductivity cell removably mounted in said tubular member for reciprocation therewith.

4. A valve and conductivity cell assembly including in combination, a housing adapted to be mounted on and in communication with a liquid flow conduit containing a liquid to be tested, a tubular member reciprocally and rotatively mounted in said housing for reciprocation therewith to operative open position and to retracted closed position, and said tubular member having its forward end closed and provided with openings in the circumferential wall thereof adjacent said forward closed end, and said tubular member including means co-active with said housing to prevent entry of liquid into the tubular member when in closed position, and further means co-active between said tubular member and said housing for preventing flow of the liquid being tested rearwardly between said tubular member and the housing in all positions of said tubular member in its movements between open and closed positions, said housing having a circumferential slot formed therein of reduced length relative to the circumferential dimension of the housing and having an axially extending slot opening into one end of the circumferential slot, both slots opening into the interior of the housing, a locking pin fixed to and projecting radially from the tubular member and adapted to travel in the slots to releasably lock the tubular member in open position, and a conductivity cell removably mounted in said tubular member for reciprocation and rotation therewith.

5. A valve and conductivity cell assembly including in combination, a housing adapted to be mounted on and in communication with a liquid flow conduit containing a liquid to be tested, a valve sleeve reciprocably mounted in said housing, and packing means coactive between said sleeve and housing to prevent leakage of liquid therebetween, means for reciprocating said valve sleeve to and from closed position, and a conductivity cell removably mounted in said valve sleeve for reciprocation therewith and in testing contact with the liquid when the valve sleeve is in open position, said conductivity cell being provided with an annular flange at the rear end thereof, and sealing means compressed between the rear end of the valve sleeve and the annular flange on the conductivity cell for preventing leakage of liquid therebetween.

References Cited in the file of this patent

UNITED STATES PATENTS

| | | |
|---|---|---|
| 1,345,032 | Smith | June 29, 1920 |
| 1,670,640 | Smith | May 22, 1928 |
| 2,221,306 | Christie | Nov. 12, 1940 |
| 2,234,056 | Moore | Mar. 4, 1941 |
| 2,611,007 | Cade et al. | Sept. 16, 1952 |